March 29, 1949.　　　　　J. F. RIXON　　　　　2,465,929
CHAIN
Filed Jan. 9, 1945　　　　　　　　　　　　2 Sheets-Sheet 1
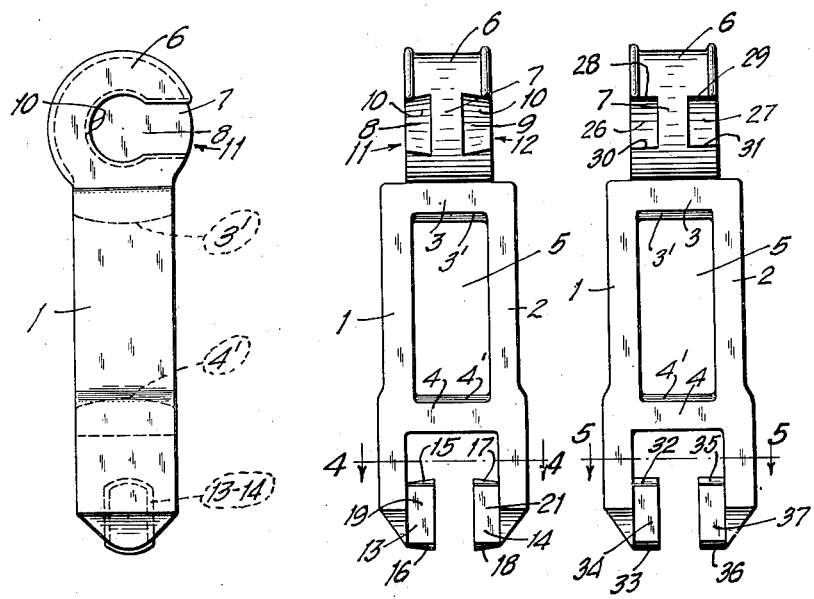
FIG.1　　　FIG.2　　　FIG.3
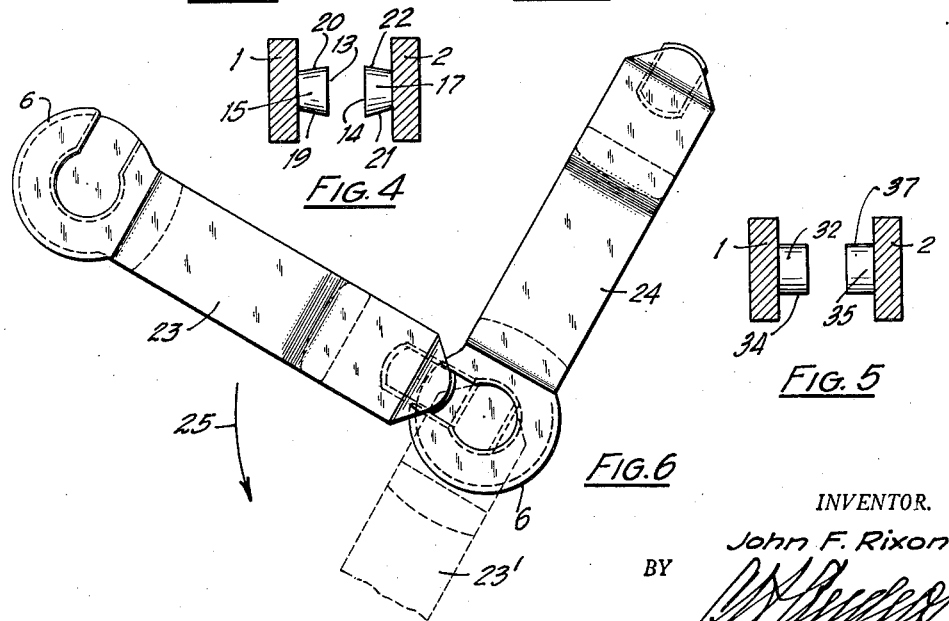
FIG.4　　　　　　　　　　FIG.5
FIG.6
INVENTOR.
John F. Rixon
BY
ATTORNEY March 29, 1949.  J. F. RIXON  2,465,929
CHAIN Filed Jan. 9, 1945  2 Sheets-Sheet 2

INVENTOR.
John F. Rixon
BY
ATTORNEY

Patented Mar. 29, 1949

2,465,929

UNITED STATES PATENT OFFICE 2,465,929

CHAIN

John F. Bixon, Hudson, N. Y., assignor to Gifford-Wood Company, Hudson, N. Y., a corporation of New York Application January 9, 1945, Serial No. 572,006

9 Claims. (Cl. 74—249)

My invention relates to chains and particularly to improvements in conveyor chains and links for forming the same.

The object of my invention is to provide a novel and improved type of chain formed from links which are connected without the use of pins or other separate connecting means and which are readily separable from each other to facilitate replacement. Another object is to provide a chain comprising a plurality of identical links which are provided with interfitting portions serving pivotally to connect the links together to form the chain; which cannot accidentally be detached from each other but which, nevertheless, may be readily detached when in certain relative positions never encountered when the chain is in actual use. A further object is to provide a chain of relatively small cross section but having high tensile strength.

With these objects in view my invention includes the novel elements and the combinations and arrangements thereof described below and illustrated in the accompanying drawings in which—

Fig. 1 is a side elevation of a link;

Fig. 2 is a right hand side view of the link shown in Fig. 1;

Fig. 3 is a view similar to Fig. 2 showing a slightly modified type of link;

Fig. 4 is a section of Fig. 2 in the plane 4—4;

Fig. 5 is a section of Fig. 3 in the plane 5—5;

Fig. 6 is a side elevation of a pair of links in the relative position in which they may be readily connected together or detached from each other;

Figure 7:
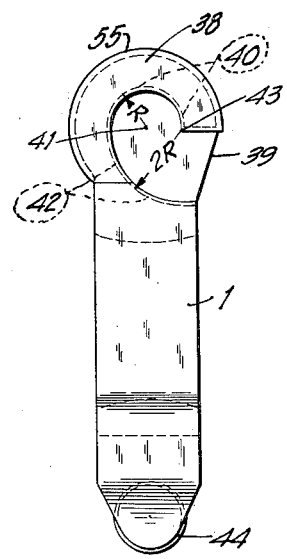
Fig. 7 is a side elevation view showing a further modified form of link.

Referring to the drawings, and first to Figs. 1, 2 and 4, my link comprises a pair of spaced side elements 1 and 2 which are connected intermediate the ends of the link by integral cross elements 3 and 4; the space 5 defined by said elements being adapted to receive a tooth of a sprocket, and the surfaces 3' and 4' of the elements 3 and 4, respectively, being curved, as best shown in Fig. 1.

At one end, the link is provided with a hook portion 6 having a centrally disposed web or diaphragm 7 therein so that the bight of the hook is divided into 2 separate hooks or portions 8 and 9 on opposite sides of the web 7. This web functions as a strengthening member for the hook so that its resistance to bending, opening or breaking under tensile strength on the chain is greatly increased.

In the species shown in Figs. 1 and 2, the surfaces 10 of the portions 8 and 9 are conical, or frusto-conical, surfaces of revolution having the bases of the cones of which they form parts lying in the sides of the web 7. Entrances to these separate portions are provided at 11 and 12.

At the opposite end, the link is bifurcated and comprises two laterally spaced elements 13 and 14, adapted to pass the web 7 of the next adjacent link therebetween. These elements comprise conical, or frusto-conical, surfaces 15, 16, 17 and 18 which are substantially complementary in shape to the frusto-conical surfaces 10 in the hook end of the next adjacent link in the chain. The front and back surfaces of the elements 13 and 14, as viewed in Fig. 2, are planes 19 and 20, and 21 and 22, respectively, (see Fig. 4) similar to the planes which define the tops and bottoms of the entrances 11 and 12 to the hook 6.

In Fig. 6 I have shown how two of my links, such as illustrated in Figs. 1, 2 and 4, may be connected or disconnected. By positioning the links at right angles to each other, as shown in Fig. 6, the elements 13 and 14 may be slid into the entrances to the hooks on opposite sides of the web 7. When the elements 13 and 14 on the link 23 have been pushed into the hook 6 on link 24 as far as possible link 23 may be swung downwardly in the direction of the arrow 25 in the position 23'. The conical surfaces on the elements 13 and 14 cooperate with the conical surfaces in the hooks in the link 24 to form a pivotal bearing upon which the links may rotate relative to each other about the axis thereof through an angle of approximately 180°, and they cannot be separated except when in the relative position shown by the solid outlines in Fig. 6.

The species of links shown in Figs. 3 and 5 is identical in all respects with the species shown in Figs. 1, 2, and 4 except that the surfaces 26 and 27 in the bight of the hook are cylindrical. The surfaces 28 and 29 which define the tops of the entrances to the hook portions on opposite sides of the web 7 lie in the same plane as do the surfaces 30 and 31 which define the bottoms of these entrances. The surfaces 32 and 33 of the element 34 and the surfaces 35 and 36 on the element 37 are cylindrical and complimentary to the cylindrical surfaces 26 and 27 in the bight of the hook.

Thus, in each species, the cooperating surfaces of adjacent links in the chain are surfaces of revolution.

In Figs. 7 to 11, inclusive, I have shown a slightly modified form of link insofar as the cooperating portions of adjacent links are concerned. In this case the sprocket receiving opening 5 is defined by the side elements 1 and 2 and the cross elements 3 and 4, as in the case of the species shown in Figs. 1 to 6, inclusive.

Figures 8, 9:
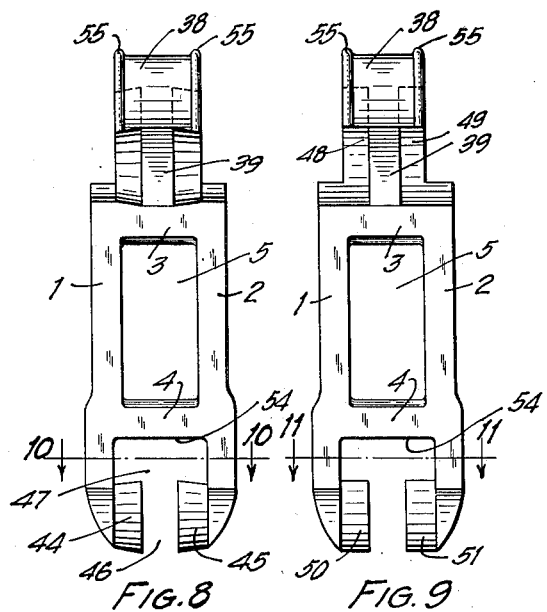
Fig. 8 is a right hand side view of the link shown in Fig. 7.
Fig. 9 is a view similar to Fig. 8 showing a slightly modified form of link.
Figure 10:
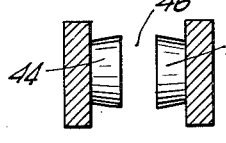
Fig. 10 is a section of Fig. 8 in the plane 10—10.

In the species shown in Figs. 7, 8, and 10 the hook end 38 of the link is provided with a central strengthening web 39 in the bight thereof and the surfaces of the bight on the opposite sides of the web are conical surfaces of revolution. Each of these surfaces comprises portions of two cones which are tangent to each other and have their bases in the adjacent side of the web 39 but which have different vertices. Thus, the cone whose base is indicated in Fig. 7 by the dotted semi-circle 40 has its vertex at the point 41 while the cone whose base is indicated by the circular arc 42, as shown in dotted outline in Fig. 7 has its vertex at the point 43. The radius 2R of the base of the cone indicated at 42 is the same as the diameter of the base of the cone indicated at 40. At the opposite end the link is bifurcated and has inwardly projecting portions 44 and 45 having conical surfaces which are substantially complementary to the conical surfaces in the bight of the hook whose bases have the radius R. The space 46 between the portions 44 and 45 is adapted to pass the web 39 and the aperture 47, which is partially defined by the cross member 4 and the conical surfaces 44 and 45, is adapted to receive the hook 38.

Figure 11:
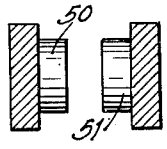
Fig. 11 is a section of Fig. 9 in the plane 11—11.

The species shown in Figs. 9 and 11 is identical with the species shown in Figs. 7, 8 and 10 except that the surfaces 48 and 49 on the opposite sides of the web 39 are cylindrical instead of conical. The inwardly projecting portions 50 and 51 at the bifurcated end of the link are also cylindrical surfaces complementary to the surfaces 48 and 49 and are adapted to cooperate with the surfaces 48 and 49 on the next adjacent link in the chain to form a pivotal connection for the links.

In Figs. 12—15, inclusive, I have indicated, in a more or less diagrammatic way, how two links, as shown in Figs. 7, 8 and 10, may be connected or disconnected. Thus the hook of link 52 is first inserted in the aperture 47 of the link 53 when the links are in about the position shown in Fig. 12. The link 53 is then swung upwardly to the consecutive positions shown in Fig. 13 and 14, whereupon it can be pushed further into the hook of link 52 and, thereafter, the link 53 may be swung downwardly to the position shown in Fig. 15.

Figures 12, 13, 14, 15:
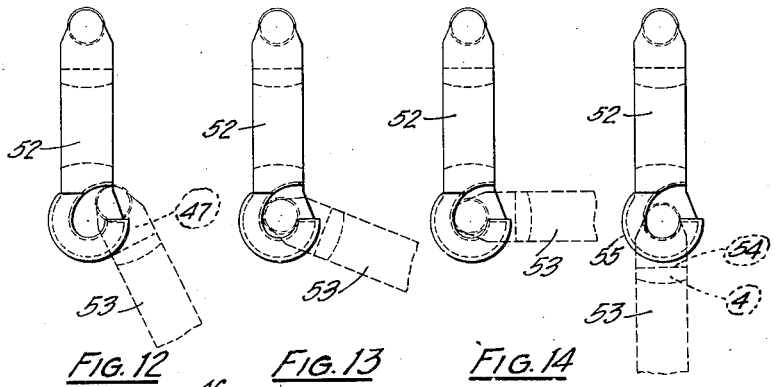
Figs. 12, 13, 14 and 15 are diagrammatic views showing how the links illustrated in Figs. 7 and 8 are connected together or detached from each other.

Referring particularly to Fig. 15, it will be apparent that the surface 54 of the cross member 4 just clears the outer surface of the beads 55 on the hook end of the link and thus serves to maintain the cooperating conical surfaces of the links substantially in proper cooperative relation. In other words, and again referring particularly to Fig. 15, the link 53 cannot be pushed upwardly to any substantial extent due to the fact that the surface 54 would contact the beads 55.

The type of link shown in Figs. 7–15, inclusive, is a somewhat better design than the links shown in Figs. 1–6 because the surfaces of revolution which cooperate to form a bearing pivotally connecting the links together are in contact with each other throughout 180°. Thus, a bearing surface of substantially greater area is provided than is the case with the links shown in Figs. 1–6.

While I have described my invention in its preferred embodiment it is to be understood that the words which I have used are words of description rather than of limitation and that changes within the purview of the appended claims may be made without departing from the true scope and spirit of my invention.

What I claim is—

1. A chain link comprising a centrally disposed hook portion at one end thereof; the bight of said hook portion comprising frusto-conical surfaces of revolution diverging towards a web therebetween; and, at the other end thereof, laterally spaced portions adapted freely to pass the web of the next adjacent link therebetween and comprising surfaces of revolution substantially complementary to and adapted to cooperate with the surfaces of revolution in the hook portion of said next adjacent link to form a portion of a chain.

2. A chain of the character described comprising a pair of links each having an integral portion cooperating with an integral portion of the other to form a bearing pivotally connecting said links together; the cooperating surfaces of said bearing being frusto-conical surfaces of revolution having their bases adjacent the longitudinal axes of said links.

3. A chain of the character described comprising a pair of links; one of said links being provided at one end with spaced, coaxial, frusto-conical surfaces of revolution disposed on opposite sides of the longitudinal axis of said links with their bases adjacent said axis; and the other of said links being provided at one end with spaced surfaces of revolution substantially complementary to and cooperating with the surfaces of revolution on said one link to form a bearing pivotally connecting said links together.

4. A link for a conveyor chain provided with an opening therein adapted to receive the tooth of a sprocket and having transversely spaced hooked portions at one end thereof with a hook strengthening web therebetween, the bights of said hook portions being frusto-conical surfaces of revolution having their bases in said web; the other end of said link being provided with transversely spaced elements adapted to pass the web of the next adjacent link therebetween and having portions adapted to cooperate with the hook portions of said next adjacent link to form a bearing pivotally connecting said links together to form a portion of said chain.

5. A chain link comprising a single centrally disposed hook at one end thereof having a single strengthening web centrally disposed within the bight of said hook and extending across the entrance to said bight, and a bifurcated portion at the other end adapted to cooperate with the hook of the next adjacent link on opposite sides of and closely adjacent the web in the bight of said hook to form a portion of a chain.

6. A chain link comprising a single centrally disposed hook at one end thereof having a bight comprising two surfaces of revolution symmetrically disposed with respect to the longitudinal axis of said link, a single web centrally disposed within said bight connecting said surfaces of revolution together and extending across the entrance to said bight to reinforce said hook, when subjected to loads, against stresses tending to bend, open or break the same; and, at the other end thereof, two laterally spaced elements adapted freely to pass the web of the next adjacent link therebetween and having exterior surfaces substantially complementary to said surfaces of revolution of said bight adapting said elements to be engaged by the hook of said next adjacent link to form a portion of a chain.

7. A chain comprising a pair of connected links, one of said links comprising a single, centrally disposed hook at one end thereof having a bight comprising two surfaces of revolution symmetrically disposed with respect to the longitudinal axis of said link and having the entrance to said hook spaced from the longitudinal axis of said link; and the other of said links being provided with two, laterally spaced elements symmetrically disposed with respect to said link axis adapted to pass through said entrance and comprising surfaces of revolution substantially complementary to and adapted to engage with the surfaces of revolution in said hook to form a portion of said chain; and a single web centrally disposed within said bight between said symmetrically disposed surfaces of revolution for reinforcing said bight and limiting the relative lateral movement of said links when connected.

8. The structure set forth in claim 6 in which the cooperating surfaces of revolution comprise cylindrical surfaces.

9. The structure set forth in claim 6 in which the cooperating surfaces of revolution comprise conical surfaces.

JOHN F. RIXON.

REFERENCES CITED

The following references are of record in the file of this patent:

UNITED STATES PATENTS

| Number | Name | Date |
| --- | --- | --- |
| 214,409 | Levalley | Apr. 15, 1879 |
| 316,992 | Moore | May 5, 1885 |
| 328,050 | Moore | Oct. 13, 1885 |
| 330,004 | Dodge | Nov. 10, 1885 |
| 2,365,866 | Dalrymple | Dec. 26, 1944 |